United States Patent [19]

Cho

[11] Patent Number: 4,865,435
[45] Date of Patent: Sep. 12, 1989

[54] OPTICAL SYSTEM FOR RANGEFINDING DEVICES

[75] Inventor: Michio Cho, Tokyo, Japan

[73] Assignee: Fuji Photo Film Co., Ltd., Kanagawa, Japan

[21] Appl. No.: 241,038

[22] Filed: Sep. 6, 1988

[30] Foreign Application Priority Data

Sep. 4, 1987 [JP] Japan .............................. 62-221262

[51] Int. Cl.$^4$ ..................... G02B 13/18; G01C 3/00
[52] U.S. Cl. ......................................... 350/432; 356/1
[58] Field of Search .............................. 350/432–435; 356/1

[56] References Cited

U.S. PATENT DOCUMENTS

| | | | |
|---|---|---|---|
| 4,330,202 | 5/1982 | Yokota | 350/432 X |
| 4,483,613 | 11/1984 | Yokota | 350/432 X |
| 4,525,040 | 6/1985 | Nakamura | 350/432 X |
| 4,595,264 | 6/1986 | Nakamura | 350/432 X |
| 4,645,311 | 2/1987 | Rothe | 350/432 |

*Primary Examiner*—Bruce Y. Arnold
*Assistant Examiner*—Scott J. Sugarman
*Attorney, Agent, or Firm*—Young & Thompson

[57] ABSTRACT

An optical lens system for a rangefinding device consists of from the object end a first lens with a convex surface directed to the other end and a second meniscus lens with a convex surface directed to the object end. The optical lens system has at least an aspheric surface on the image end surface of the second meniscus lens.

14 Claims, 9 Drawing Sheets

SPHERICAL
ABERRATION
(mm)

ASTIGMATISM
(mm)

DISTORTION
(%)

OPTICAL SYSTEM FOR RANGEFINDING DEVICES

BACKGROUND OF THE INVENTION

The present invention relates to an active-type trigonometric rangefinding optical system in which light is projected to an object and the reflected light from the object is received by a rangefinder.

Active-type trigonometric rangefinders used on, for example, modern compact still cameras project light such as near-infrared light to a subject and receive the reflected light from the subject by means of a photoconversion element. The reflected light falls upon the photoconversion element over a certain width. This width on the photoconversion element causes errors in measured subject distances.

In an attempt at avoiding measurement errors, there have been proposed various optical systems for use with active-type rangefinders. One such optical system disclosed in, for example, Japanese Patent Publ. No. 61-20,884 utilizes a single aspherical lens therein for correcting aspherical and coma aberrations so as to form a sharply focused spot on incident light on the photoconversion element. Another optical system disclosed in Japanese Patent Unexam. Publ. No. 62-47,613 utilizes double aspherical lenses so as deliberately to produce an increased curvature of field in order to form a relatively small light spot projected onto a subject within an effective subject distance measurement range even though the light spot is out of focus on the subject and is reflected from the subject and falls on the photoconversion element.

In the optical system disclosed in the former publication Pat. No. 61-20,841, because of a small curvature of field in a meridianal surface produced by the optical system, if the light projecting lens system is focused on a subject at an infinite distance, it is hard to focus it on subjects at relatively short distances, resulting in an inaccurate subject distance measurement.

On the other hand, in the optical system disclosed in the latter publication Pat. No. 62-47,613, although the above described disadvantage associated with the optical system disclosed in the former publication is overcome, there is still the disadvantage that the optical system produces curvature of field, which cannot be disregarded not only in a meridianal image surface but also in a sagittal image surface because of the Petzval sum being increased in order to produce a significant curvature of field.

If one incorporates the optical system taught by the above described publication Pat. No. 62-47,613 into a rangefinding device such as is disclosed in Japanese Patent Unexam. Publ. No. 61-246,726, which is of the type projecting light in the form of a line extending in a direction perpendicular to the direction of a base line to a subject in order to measure an extensive area in the field of the rangefinder, the distance of a plurality of subjects within the same subject distance zone can be measured. In such a case, there are light spots incident upon the photoconversion element at different positions which may not be equally in focus.

OBJECT OF THE INVENTION

It is, therefore, an object of the present invention to provide an optical system for use with a camera rangefinder, which can focus light on a photodetecting element of the rangefinder or on a subject to be measured, with decreased aberration.

SUMMARY OF THE INVENTION

For accomplishing the above object, the present invention provides an optical lens system of a rangefinding device which can produce a relatively large curvature of field in the meridianal image surface but can focus light without fuzziness on a subject such as a subject whose distance is to be measured or on a photoelectric element of the rangefinding device. In the optical system, the curvature of field at a point shifted from the direction of the base line of the rangefinding device is controlled to be smaller in the sagittal image surface than in the meridianal image surface, thereby making a difference between the curvature of field of the shifted point in the base line direction, which is given as the composed curvature of field of the field curvatures in the sagittal and meridianal image surfaces at the shifted point, and the curvature of field at a point in the base line direction.

Briefly stated, the optical lens system for a rangefinding device of the present invention comprises, from the object end, a first single lens element having a convex surface directed toward the object, a second single lens element having a convex surface directed toward the object and an aspherical surface directed away from the object, and a flat glass plate attached to a photoelectric element.

DETAILED DESCRIPTION OF THE INVENTION

Figure 1:
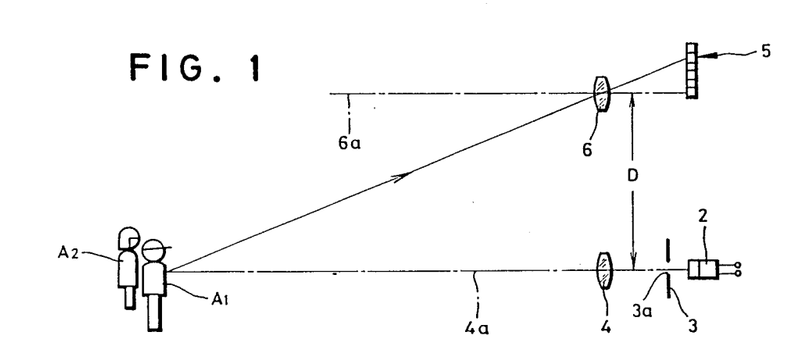
FIG. 1 is an illustration showing an example of an active-type photoelectric rangefinder.
Figure 2:
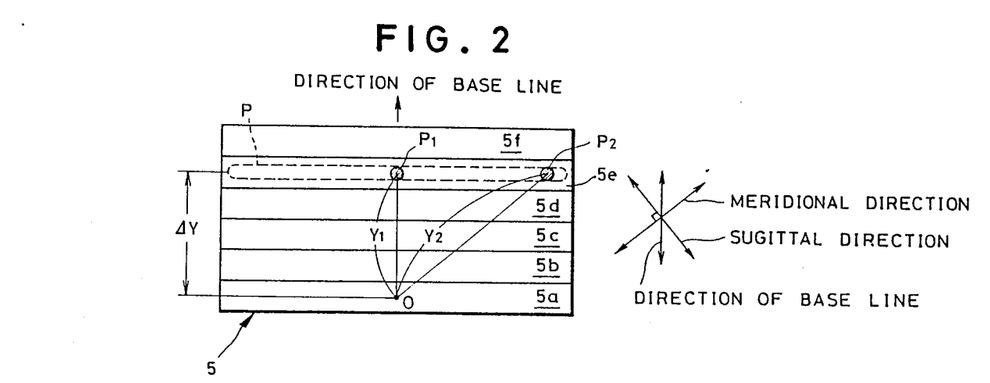
FIG. 2 is an explanatory illustration showing light spots focused on a light sensor.
Figure 3:
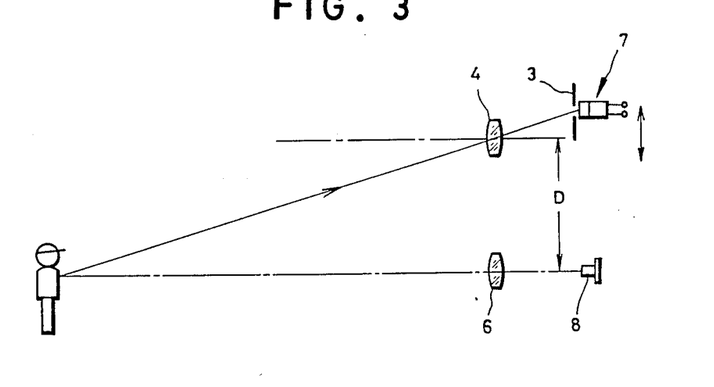
FIG. 3 is an illustration showing another example of an active-type photoelectric rangefinder.

Before describing the present invention in detail, reference is made to FIGS. 1 to 3 for the purpose of providing a brief background that will enhance an understanding of the optical effects of the optical system according to the present invention.

As is shown in FIG. 1, in an active-type rangefinding device, light projecting means 2 projects light in the form of a line extending perpendicularly to the surface of the drawing to a subject ($A_1$, $A_2$) through a slit plate 3 with a vertical slit 3a and a projection lens 4 disposed in front of the light projecting means 2. A light sensor 5 spaced from the light projecting means 2 by a base length D receives the reflected light from the subject through a lens 6.

The light sensor 5, as is shown in FIG. 2, comprises a plurality of elongated photoelectric elements 5a to 5f arranged side by side in the direction of the base line of the rangefinding device. If there are two subjects standing side by side at the same distance from the rangefinding device, with one subject $A_1$ situated on the optical axis 4a of the projection lens 4 and the other subject $A_2$ off the optical axis 4a, the light reflected from the two subjects $A_1$ and $A_2$ will fall on the same photoelectric element 5e of the light sensor 5 at positions $P_1$ and $P_2$, respectively. If the projected light in the form of a vertical line is wholly reflected by a flat surface such as a wall, the reflected light will fall in a line on the light sensor 5 as shown by a broken line in FIG. 2. A point 0 on the light sensor 5 shows the optical axis 6a of the lens 6 disposed in front of the light sensor 5.

In this case, the light spots falling on the photoelectric element 5e of the light sensor 5 at the positions $P_1$ and $P_2$ are spaced different distances $Y_1$ and $Y_2$ from the point (optical axis) O. Due to the difference of distance, the rangefinding optical system such as disclosed in the above-described Japanese Patent Unexam. Publ. No. 62-47,613, in which field curvatures produced in the meridianal and sagittal image surfaces do not greatly differ, is incapable of reducing the degree of lateral aberration (which means, in this specification, the degree of getting out of focus in the direction of the base line of the rangefinder) for both the light spots at the positions $P_1$ and $P_2$. Such an inclination is induced not only when light spots fall on the same photoelectric element at different positions but also when light falls on the light sensor 5 at different positions in the direction from right to left as viewed in FIG. 2.

The above problem is also present in another active-type rangefinding device shown in FIG. 3, which projects a slit line of light to a subject by means of light projecting means 7 moving in the direction of the base line and receives the reflected light from the subject by the light sensor 8 and a subject distance signal is provided based on the position of the light projecting means upon the detection of the reflected light by the light sensor 8.

According to the present invention, the rangefinding optical system comprises two single element lenses, namely a first biconvex or positive meniscus lens nearest the subject with a convex surface having a strong curvature directed toward the subject and a second negative or negative meniscus lens away from the subject with a convex surface directed toward the subject. The optical system provides an aspherical surface of the second lens directed toward the image, that is, away from the subject and is associated with a light sensor with a transparent protective glass plate 13 facing the aspherical surface of the second lens, which is located in the focal plane of the optical system.

Letting Z denote the surface sag (which is the distance measured perpendicularly from the plane which is perpendicular to the optical axis and tangent to the vertex of the lens, and is a function of a semi-aperture distance h) at a semi-aperture distance h from the optical axis, r the radius of curvature of the lens surface at the optical axis, $a_i$ the aspherical coefficient of the i-th order and K the conic constant, the aspherical surface is defined by the following equation:

$$Z(h) = \frac{h^2/r}{1 + \sqrt{1 - (1+k)(h^2/r^2)}} + a_1 h^4 + a_2 h^6 + a_3 h^8 + a_4 h^{10} + \ldots \quad (1)$$

The optical system of the invention satisfies the following conditions:

$$0.75 < \frac{f}{f_1} < 1.25 \quad (2)$$

$$-1.40 < \frac{f}{f_2} < 0.25 \quad (3)$$

$$0.5 < \frac{(d_1/n_1) + d_2 + (d_3/n_2)}{f} < 0.95 \quad (4)$$

$$-0.003 < \frac{\Delta Z_2}{f} \leq 0 \quad (5)$$

$$-0.00015 < \frac{\Delta Z_2}{f} \leq 0 \quad (6)$$

wherein
Z is the surface sage of the i-th lens surface at a semi-aperture distance h from the optical axis;
r is the radius of curvature of the lens surface at the optical axis;
k is the conic constant;
$a_1$ to $a_4$ are aspheric coefficients;
f is the focal length of the overall optical system;
$f_i$ is the focal length of the i-th lens;
$d_i$ is the thickness or aerial distance between the i-th and (i+1)-th surfaces;
$n_i$ is the refractive index of the i-th lens or transparent plate;
$r_i$ is the radius of curvature of the i-th lens surface which is an aspherical surface; and $Z_{i1}$ and $Z_{i2}$ are the values when h is replaced by $r_i/4$ and $r_i/5$ in the following equation (7), respectively:

$$\Delta Z(h) = \frac{h^2/r_i}{1 + \sqrt{1 - (1+k)(h^2/r_i^2)}} - \frac{h^2/r_i}{1 + \sqrt{1 - (h^2/r_i^2)}} + a_1 h^4 + a_2 h^6 + a_3 h^8 + a_4 h^{10} + \ldots \quad (7)$$

More particularly:

Z is the surface sag at a semi-aperture distance h from the optical axis of the lens system;

r is the radius of curvature of the lens surface at the optical axis;

k is a conic constant;

$a_1$, $a_2$, $a_3$ and $a_4$ are aspheric coefficients for forth, sixth, eighth and tenth orders, respectively f is the focal length of the overall optical system;

$f_1$ and $f_2$ are the focal lengths of the first and second lens elements, respectively;

$d_1$ and $d_3$ are the thicknesses of the first and second lens elements;

$d_2$ is the distance between the first and second lens elements;

$n_1$ and $n_2$ are the refractive indices of the first and second lens elements;

$r_4$ is the radius of curvature of the fourth lens surface which is the aspheric lens surface; and $Z_1$ and $Z_2$ are the values when h is substituted by $r_4/4$ and $r_4/5$ in the following equation (7), respectively:

$$\Delta Z(h) = \frac{h^2/r_i}{1 + \sqrt{1 - (1+k)(h^2/r_i^2)}} - \frac{h^2/r_i}{1 + \sqrt{1 - (h^2/r_i^2)}} + a_1 h^4 + a_2 h^6 + a_3 h^8 + a_4 h^{10} + \ldots \quad (7)$$

The conditions (2) and (3) are related to the Petzval sum. If either the lower limit of the condition (2) or the upper limit of the condition (3) were exceeded, the Petzval sum would be increased and the curvature of the field would become too great. Upon either the upper limit of the condition (2) or the lower limit of the condition (3) being exceeded, the Petzval sum would become too small, the difference of the curvature of the field between in sagittal and meridianal image surfaces would become large and the first and second lenses needs to have high refraction indices, producing coma aberrations.

The condition (4) is related to the Petzval sum and astigmatism. If the lower limit of the condition (4) were exceeded, it would become hard to produce a suitable degree of astigmatism while controlling various aberrations. If the light is far from the center of the slit line of light projected, the degree of shift of focus will be large. If the lower limit of the condition (4) is exceeded, the Petzval sum would become too small and astigmatism would become too great.

The conditions (5) and (6) are related to astigmatism. If the lower limits of the conditions (5) and (6) were exceeded, astigmatism, in particular the curvature of field in a meridianal image surface, would become too great. If the upper limits of the conditions (5) and (6) were exceeded, astigmatism would become less than a suitable degree of astigmatism.

Referring again to FIG. 2, an example to which the present invention is applied will be described. In this example, letting L be the subject distance and f the focal length of the lens 6, the distance $\Delta Y$ between the optical axis O and the position $P_i$ of the light spot reflected by a subject at the distance L in a direction parallel to the base line having a base length D, is given by the following equation:

$$\Delta Y = D \times f / L \quad (8)$$

In order that a light spot reflected by the subject at the subject distance L be sharply focused, the curvature of field $\Delta f$ in the direction of the base length should be as follows:

$$\Delta f = 1/[(1/f)+(1/L)] - f = -f^2/(f+L) \quad (9)$$

The curvature of field $\Delta f$ is equal to the curvature of field $\Delta M$ in the meridianal image surface when the light spot is at the middle of the virtual slit image P, and substantially equal to a component of the curvatures $\Delta M$ and $\Delta S$ of field in the meridianal and sagittal image surfaces in the direction of the base line when the light spot is at th other points of the virtual slit image P.

From the equations (8) and (9), the curvature of field $\Delta f$ is expressed by the following equation:

$$\Delta f = -f^2/(f + D \times f/\Delta Y) = -f/(1 + D/\Delta Y) \quad (10)$$

As will be apparent from equation (10), an optical lens system which satisfies the previous conditions (2) to (6) makes the curvature of field $\Delta f$ sufficiently small. It is to be noted that the optical lens system may be used as either one or both of the light projecting and light receiving lenses 4 and 6 of the rangefinder.

Figure 4:
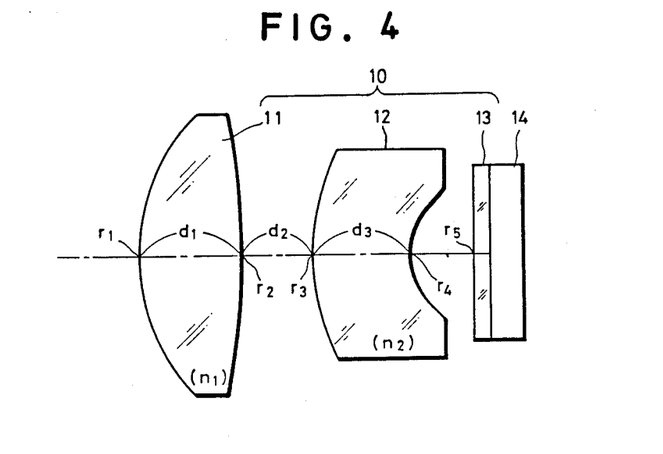
FIG. 4 is a longitudinal sectional view of a first example of an optical lens system for a rangefinding device according to the present invention.

Numerical data for Examples I through VII according to the present invention will be described below. In Example I shown in FIG. 4, the rangefinding optical lens system 10 comprises the first and second single lenses 11 and 12 arranged in order from the subject, in front of the light sensor 14 covered with a transparent protective glass 13 located in the focal plane of the optical system 10. The first lens 11 is a biconvex lens element with a convex surface directed to the subject and the second lens is a negative meniscus lens element. Numerical data for the optical system shown in FIG. 4 are as follows:

EXAMPLE I

| f = 12 mm, $F_{NO}$ = 1.4, $S_L$ = 3.5 mm, D = 51 mm | | | |
|---|---|---|---|
| Surface Number $S_i$ | $r_i$ | $d_i$ | $n_i$ |
| S1 | 6.009(*) | 3.902 | 1.48554 |
| S2 | −23.692 | 2.561 | |
| S3 | 7.825 | 3.500 | 1.48554 |
| S4 | 2.394(*) | 2.428 | |
| S5 | — | 0.6 | 1.55 |

The first and fourth surface $S_1$ and $S_4$ indicated by an asterisk (*) are aspherical surfaces whose surface sag Z is given by the equation (1), and the aspheric coefficients $a_i$ for the i-th order are as follows and the conic constant k:

| Aspherical Coefficients: | |
|---|---|
| $S_1$ | $S_4$ |

-continued

|  | | |
|---|---|---|
| $a_1$ | $-0.2234 \times 10^{-3}$ | $-0.5095 \times 10^{-2}$ |
| $a_2$ | $0.6072 \times 10^{-5}$ | $0.9799 \times 10^{-2}$ |
| $a_3$ | $-0.7823 \times 10^{-6}$ | $-0.2149 \times 10^{-2}$ |
| $a_4$ | $0.1669 \times 10^{-7}$ | $-0.4195 \times 10^{-9}$ |

Conic Constant:

| | $S_1$ | $S_4$ |
|---|---|---|
| k | $-0.4852$ | 0 |

The optical system according to the first Example I has the focal length and F-number of the overall optical system, $f=12$ mm and $F_{NO}=1.4$. When the length of the slit light $S_L$ is 3.5 mm on the light sensor 13 and the base length D is 51 mm, the rangefinding optical system can focus the reflected light well on the light sensor 13.

Figure 5A:
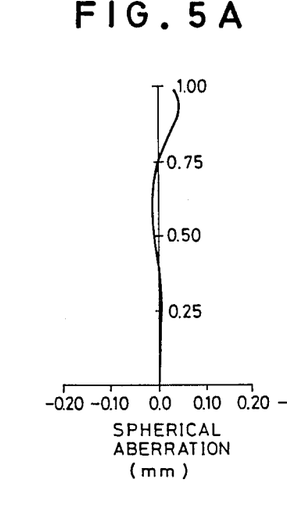
FIGS. 5A, 5B and 5C illustrate graphs of spherical aberration, astigmatism and distortion, respectively, of the optical lens system of FIG. 4.
Figure 5B:
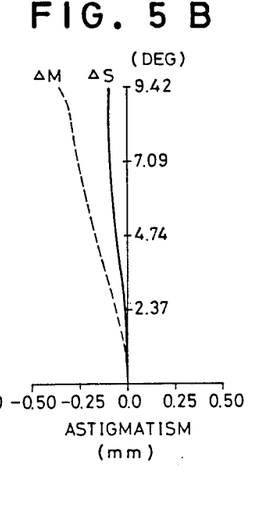
Figure 5C:
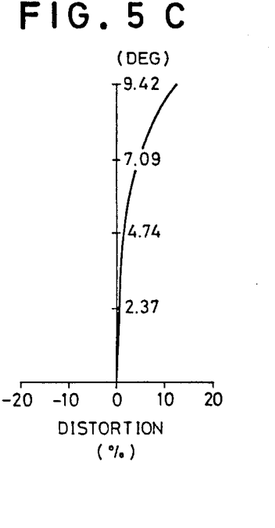

According to the numerical data of Example I, the conditions (2) through (6) are satisfied as follows:

$f/f_1 = 1.16$ $f/f_2 = 1.33$ $[(d_1/n_1) + d_2 + (d_3/n_2)]/f = 0.6269$ $\Delta Z_1/f = -0.0002$ $\Delta Z_2/f = -0.0002$ FIGS. 5A to 5C show various aberrations, namely aspherical aberration, astigmatism and distortion, respectively. In this Example I, an optimum curvature of field $\Delta f$ of an image which is focused at a position of a distance $\Delta Y=1$ mm is calculated as $-0.23$ mm by the equation (9) and, on the other hand, the curvature of field $\Delta M$ in the meridianal image surface is given as approximately $-0.18$ mm in FIG. 5B. Therefore, there is a difference of about 0.05 mm.

Figure 18:
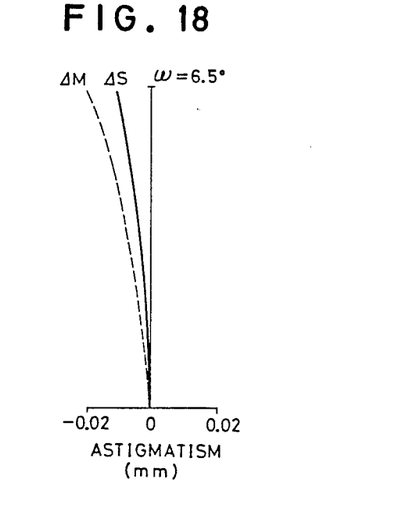
FIG. 18 illustrates a graph of astigmatism of a conventional optical system for a rangefinding device.

The optical lens system described in the abovementioned Japanese Patent Publ. No. 61-20,841 shows astigmatism depicted in FIG. 18. In FIG. 18, the optical lens system has a focal length (f) of 1 mm. Assuming the focal length (f) of this prior art optical lens system is 12 mm and the curvature of field $\Delta Y$ 1 mm, the curvature of field $\Delta M$ is approximately $-0.14$ mm.

From a comparison of the results, the optimum field curvature of the optical lens system of the present invention is less than the prior art optical lens system. The difference is estimated to be about 0.09 mm.

A lens shown in FIG. 6 scaled to an f of 12 mm, an $F_{NO}$ of 1.38, and $S_L$ of 3.5 mm and a D of 51.3 mm is described as follows:

EXAMPLE II $f = 12$ mm, $F_{NO} = 1.38$, $S_L = 3.5$ mm, $D = 51.3$ mm

| Surface Number $S_i$ | $r_i$ | $d_i$ | $n_i$ |
|---|---|---|---|
| S1 | 5.500(*) | 3.500 | 1.48554 |
| S2 | 35.043 | 6.074 | |
| S3 | 3.752(*) | 1.500 | 1.48554 |
| S4 | 2.750(*) | 2.100 | |
| S5 | — | 0.54 | 1.52 |

Aspherical Surfaces: $S_1$, $S_3$ and $S_4$
Aspherical Coefficients:

| | $S_1$ | $S_3$ | $S_4$ |
|---|---|---|---|
| $a_1$ | $-0.1177 \times 10^{-4}$ | $-0.3535 \times 10^{-2}$ | $-0.1411 \times 10^{-1}$ |
| $a_2$ | $0.5857 \times 10^{-5}$ | $-0.2682 \times 10^{-2}$ | $-0.2221 \times 10^{-2}$ |
| $a_3$ | $-0.3521 \times 10^{-6}$ | $0.1874 \times 10^{-3}$ | $-0.5625 \times 10^{-8}$ |
| $a_4$ | $0.8086 \times 10^{-8}$ | $0.1394 \times 10^{-10}$ | $-0.3768 \times 10^{-10}$ |

Conic Constant:

| k | $-0.4350$ | 0 | 0 |
|---|---|---|---|

Figure 6:
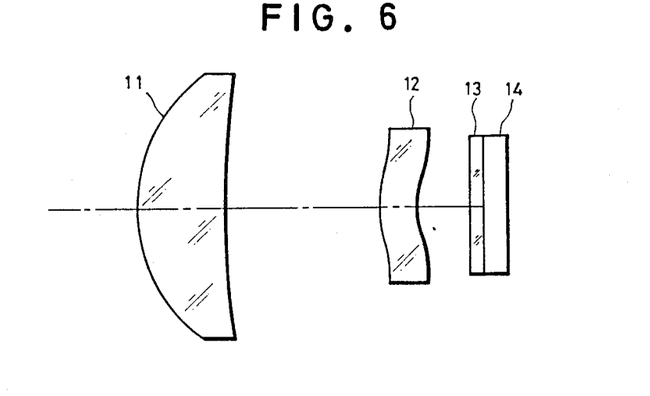
FIG. 6 is a longitudinal sectional view of a second example of an optical lens system for a rangefinding device according to the present invention.
Figure 7A:
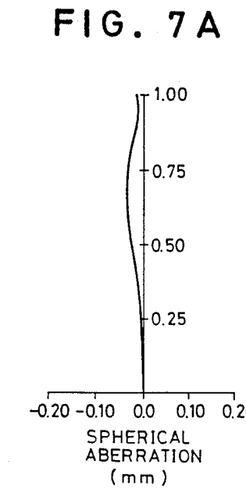
FIGS. 7A, 7B and 7C illustrate graphs of spherical aberration, astigmatism and distortion, respectively, of the optical lens system of FIG. 6.
Figure 7B:
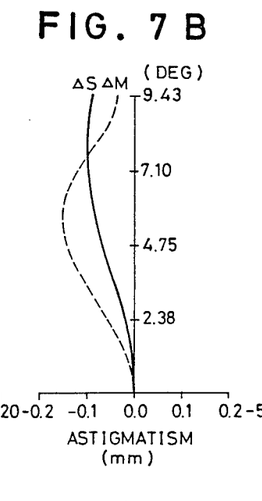
Figure 7C:
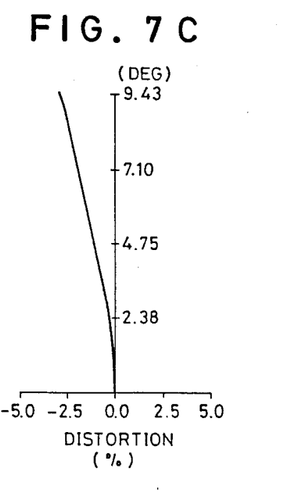

$f/f_1 = 0.93$
$f/F_2 = 0.29$
$[(d_1/n_1) + d_2 + (d_3/n_2)]/f = 0.7855$
$\Delta Z_1/f = -0.0034$
$\Delta Z_2/f = -0.0014$ FIGS. 7A to 7C show various aberrations of the optical lens system of FIG. 6.

Figure 8:
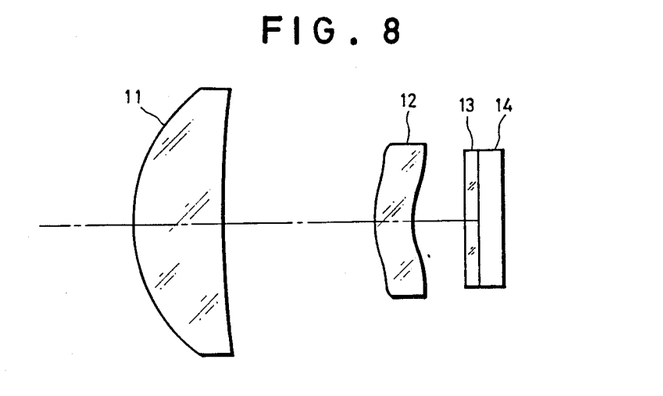
FIG. 8 is a longitudinal sectional view of a third example of an optical lens system for a rangefinding device according to the present invention.

A lens system as shown in FIG. 8 scaled to an f of 12 mm, an $F_{NO}$ of 1.38, an $S_L$ of 3.5 mm and a D of 51.3 mm is substantially described as follows:

EXAMPLE III $f = 12$ mm, $F_{NO} = 1.38$, $S_L = 3.5$ mm, $D = 51.3$ mm

| Surface Number $S_i$ | $r_i$ | $d_i$ | $n_i$ |
|---|---|---|---|
| S1 | 5.500(*) | 3.500 | 1.48554 |
| S2 | 36.467 | 6.082 | |
| S3 | 3.868(*) | 1.500 | 1.48554 |
| S4 | 2.820(*) | 2.077 | |
| S5 | — | 0.54 | 1.52 |

Aspherical Surfaces: $S_1$, $S_3$ and $S_4$
Aspherical Coefficients:

| | $S_1$ | $S_3$ | $S_4$ |
|---|---|---|---|
| $a_1$ | $0.2712 \times 10^{-4}$ | $-0.4947 \times 10^{-2}$ | $-0.1693 \times 10^{-1}$ |
| $a_2$ | $-0.1243 \times 10^{-5}$ | $-0.1929 \times 10^{-2}$ | $-0.1345 \times 10^{-2}$ |
| $a_3$ | $0.4279 \times 10^{-7}$ | $-0.5050 \times 10^{-5}$ | $-0.1626 \times 10^{-7}$ |
| $a_4$ | $-0.2478 \times 10^{-9}$ | $0.2020 \times 10^{-4}$ | $-0.1226 \times 10^{-9}$ |

Conic Constant:

| k | $-0.4224$ | 0 | 0 |
|---|---|---|---|

Figure 9A:
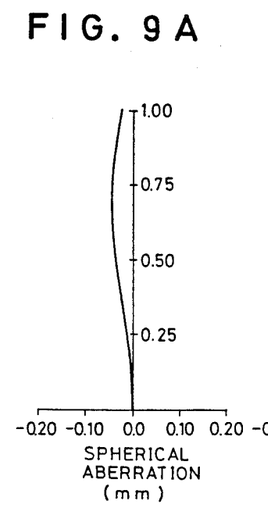
FIGS. 9A, 9B and 9C illustrate graphs of spherical aberration, astigmatism and distortion, respectively, of the optical lens system of FIG. 8.
Figure 9B:
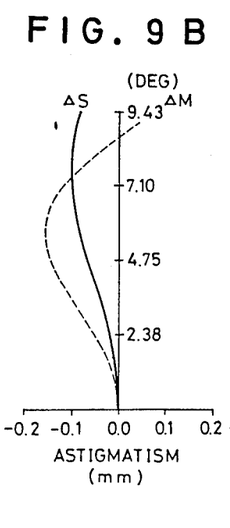
Figure 9C:
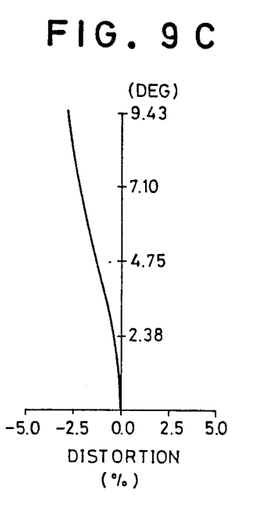

$f/f_1 = 0.93$
$f/f_2 = -0.30$
$[(d_1/n_1) + d_2 + (d_3/n_2)]/f = 0.7862$
$\Delta Z_1/f = -0.0044$
$\Delta Z_2/f = -0.0018$ FIGS. 9A to 9C show various aberrations of the optical lens system of FIG. 8.

Figure 10:
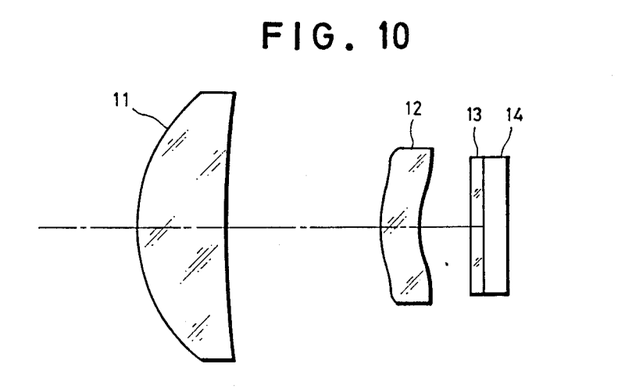
FIG. 10 is a longitudinal sectional view of a fourth example of an optical lens system for a rangefinding device according to the present invention.

A lens system shown FIG. 10 scaled to a focal length of 12 mm, and F-number of 1.38, an $S_L$ of 3.5 mm and a D of 51.3 mm.

EXAMPLE IV $f = 12$ mm, $F_{NO} = 1.38$, $S_L = 3.5$ mm, $D = 51.3$ mm

| Surface Number $S_i$ | $r_i$ | $d_i$ | $n_i$ |
|---|---|---|---|
| S1 | 5.500(*) | 3.500 | 1.48554 |
| S2 | 36.381 | 6.087 | |
| S3 | 3.884(*) | 1.507 | 1.48554 |
| S4 | 2.831(*) | 2.070 | |
| S5 | — | 0.54 | 1.52 |

Aspherical Surfaces: $S_1$, $S_3$ and $S_4$
Aspherical Coefficients

| | $S_1$ | $S_3$ | $S_4$ |
|---|---|---|---|
| $a_1$ | $0.5873 \times 10^{-4}$ | $-0.4850 \times 10^{-2}$ | $-0.1675 \times 10^{-1}$ |
| $a_2$ | $-0.4876 \times 10^{-5}$ | $-0.1929 \times 10^{-2}$ | $-0.1345 \times 10^{-2}$ |
| $a_3$ | $0.3531 \times 10^{-6}$ | $-0.5052 \times 10^{-5}$ | $-0.1626 \times 10^{-7}$ |
| $a_4$ | $-0.7729 \times 10^{-8}$ | $0.2020 \times 10^{-4}$ | $-0.1222 \times 10^{-9}$ |

Conic Constant:

| k | $-0.4456$ | 0 | 0 |
|---|---|---|---|

Figure 11A:
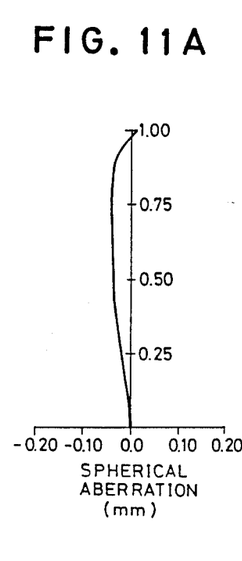
FIG. 11A, 11B and 11C illustrate graphs of spherical aberration, astigmatism and distortion, respectively, of the optical lens system of FIG. 10.
Figure 11B:
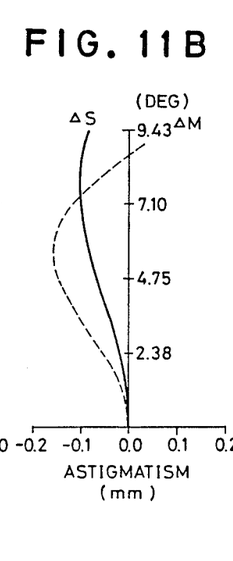
Figure 11C:
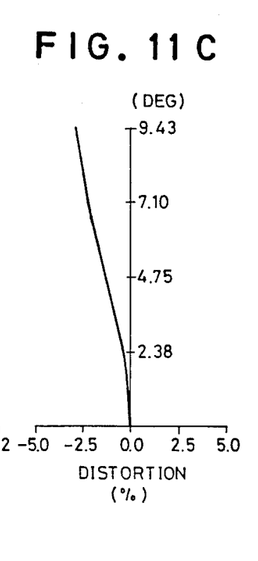

$f/f_1 = 0.93$
$f/f_2 = -0.30$
$[(d_1/n_1) + d_2 + (d_3/n_2)]/f = 0.7869$
$\Delta Z_1/f = -0.0044$
$\Delta Z_2/f = -0.0018$ FIGS. 11A to 11C show various aberrations of the optical lens system of FIG. 10.

Figure 12:
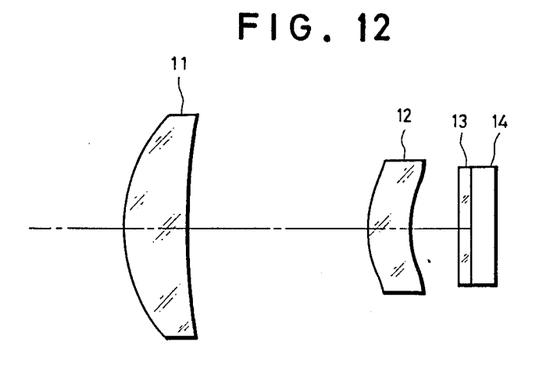
FIG. 12 is a longitudinal sectional view of a fifth example of an optical lens system for a rangefinding device according to the present invention.

FIG. 12 shows a fifth example of an optical lens system of the present invention, of which the numerical data are as follows:

EXAMPLE V $f = 11.97$ mm, $F_{NO} = 1.4$, $S_L = 3.5$ mm, $D = 51.3$ mm

| Surface Number Si | $r_i$ | $d_i$ | $n_i$ |
|---|---|---|---|
| S1 | 5.884(*) | 2.815 | 1.48554 |
| S2 | 26.632 | 7.564 | |
| S3 | 3.697(*) | 1.818 | 1.48554 |
| S4 | 3.499(*) | 2.064 | |
| S5 | — | 0.54 | 1.52 |

Aspherical Surfaces: $S_1$, $S_3$ and $S_4$
Aspherical Coefficients:

| | $S_1$ | $S_3$ | $S_4$ |
|---|---|---|---|
| $a_1$ | $0.2700 \times 10^{-3}$ | $0.9211 \times 10^{-2}$ | $-0.1171 \times 10^{-1}$ |
| $a_2$ | $-0.6796 \times 10^{-4}$ | $-0.9817 \times 10^{-3}$ | $0.1040 \times 10^{-5}$ |
| $a_3$ | $0.4770 \times 10^{-5}$ | $0.2541 \times 10^{-8}$ | $0.2232 \times 10^{-7}$ |
| $a_4$ | $-0.1184 \times 10^{-6}$ | $-0.5046 \times 10^{-10}$ | $0.4939 \times 10^{-9}$ |

Conic Constant:

| k | $-0.2714$ | $-8.5244$ | 0 |
|---|---|---|---|

Figure 13A:
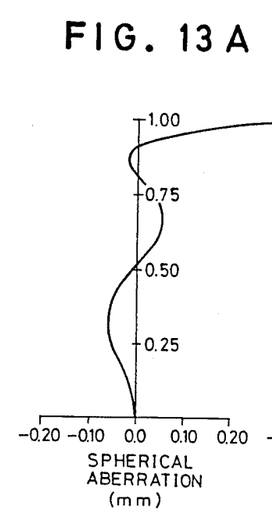
FIGS. 13A, 13B and 13C illustrate graphs of spherical aberration, astigmatism and distortion, respectively, of the optical lens system of FIG. 12.
Figure 13B:
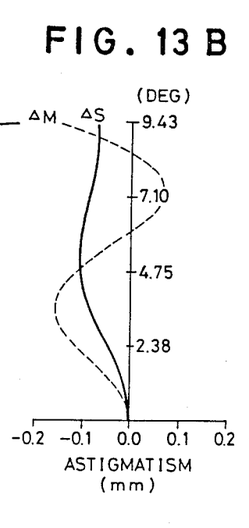
Figure 13C:
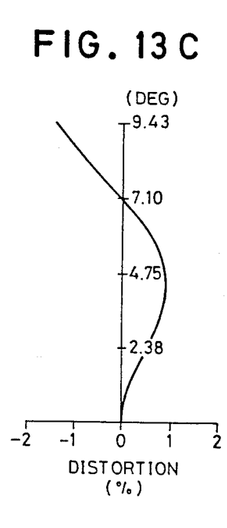

$f/f_1 = 0.81$
$f/f_2 = 0.18$
$[(d_1/n_1) + d_2 + (d_3/n_2)]/f = 0.9050$
$\Delta Z_1/f = -0.0069$
$\Delta Z_2/f = -0.0028$ FIGS. 13A to 13C show various aberrations of the optical lens system of FIG. 12.

Figure 14:
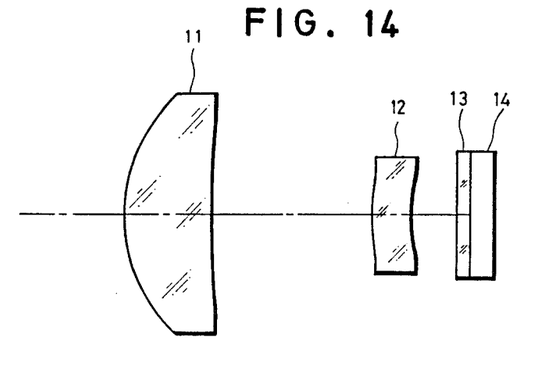
FIG. 14 is a longitudinal sectional view of a sixth example of an optical lens system for a rangefinding device according to the present invention.

FIG. 14 shows a sixth example of an optical lens system of the present invention, of which the numerical data are as follows:

EXAMPLE VI $f = 11.97$ mm, $F_{NO} = 1.46$, $S_L = 3.5$ mm, $D = 51.3$ mm

| Surface Number Si | $r_i$ | $d_i$ | $n_i$ |
|---|---|---|---|
| S1 | 5.508(*) | 3.490 | 1.48554 |
| S2 | 52.267 | 6.320 | |
| S3 | 5.779(*) | 1.500 | 1.48554 |
| S4 | 4.092(*) | 1.790 | |
| S5 | — | 0.540 | 1.52 |

Aspherical Surfaces: $S_1$, $S_3$ and $S_4$
Aspherical Coefficients:

| | $S_1$ | $S_3$ | $S_4$ |
|---|---|---|---|
| $a_1$ | $0.1312 \times 10^{-3}$ | $-0.1142 \times 10^{-1}$ | $-0.1615 \times 10^{-1}$ |
| $a_2$ | $-0.7635 \times 10^{-4}$ | $-0.6822 \times 10^{-3}$ | $-0.4298 \times 10^{-6}$ |
| $a_3$ | $0.5380 \times 10^{-5}$ | $0.1389 \times 10^{-4}$ | $-0.6960 \times 10^{-8}$ |
| $a_4$ | $-0.1444 \times 10^{-6}$ | $0.2020 \times 10^{-4}$ | $-0.1056 \times 10^{-9}$ |

Conic Constant:

| k | $-0.1647$ | $-0.8669$ | $-1.0152$ |
|---|---|---|---|

Figures 15A, 15B:
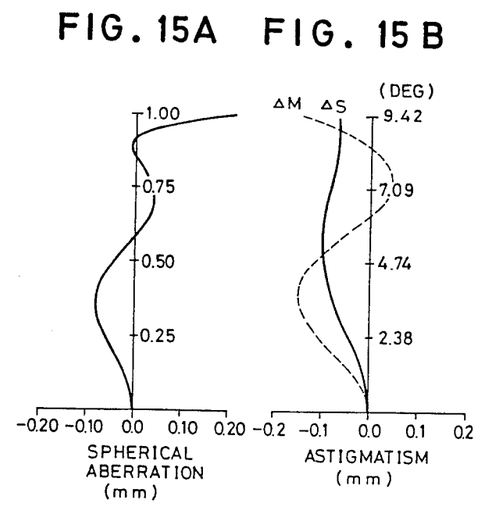
FIGS. 15A, 15B and 15C illustrate graphs of spherical aberration, astigmatism and distortion, respectively, of the optical lens system of FIG. 14.
Figure 15C:
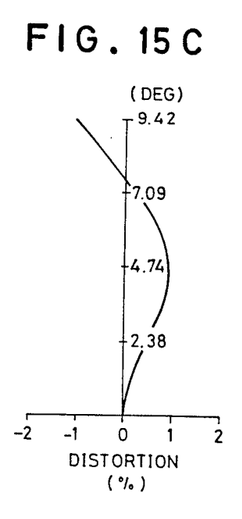

$f/f_1 = 0.97$
$f/f_2 = -0.29$
$[(d_1/n_1) + d_2 + (d_3/n_2)]/f = 0.8074$
$\Delta Z_1/f = -0.0177$
$\Delta Z_2/f = -0.0072$ FIGS. 15A and 15B show various aberrations of the optical lens system of FIG. 14.

Figure 16:
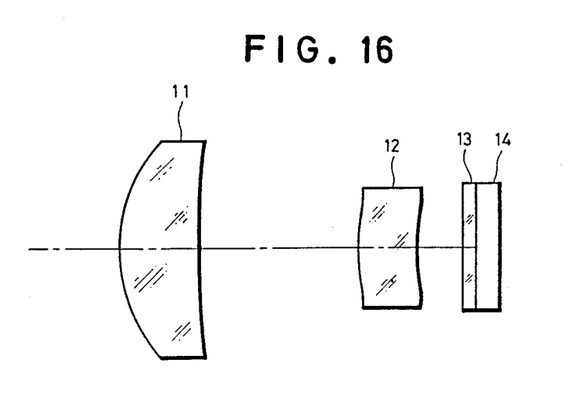
FIG. 16 is a longitudinal sectional view of a seventh example of an optical lens system for a rangefinding device according to the present invention.

FIG. 16 shows a seventh example of an optical lens system of the present invention, of which the numerical data are as follows:

EXAMPLE VII $f = 11.97$ mm, $F_{NO} = 1.52$, $S_L = 3.5$ mm, $D = 51.3$ mm

| Surface Number Si | $r_i$ | $d_i$ | $n_i$ |
|---|---|---|---|
| S1 | 5.500(*) | 3.155 | 1.48554 |
| S2 | 35.707 | 6.239 | |

EXAMPLE VII-continued

| | | | |
|---|---|---|---|
| S3 | 6.951(*) | 2.267 | 1.48554 |
| S4 | 5.132(*) | 1.799 | |
| S5 | — | 0.54 | 1.52 |

Aspherical Surfaces: $S_1$, $S_3$ and $S_4$
Aspherical Coefficients:

| | $S_1$ | $S_3$ | $S_4$ |
|---|---|---|---|
| $a_1$ | $-0.1722 \times 10^{-3}$ | $-0.8320 \times 10^{-2}$ | $-0.2586 \times 10^{-3}$ |
| $a_2$ | $-0.1860 \times 10^{-3}$ | $0.1020 \times 10^{-3}$ | $-0.4693 \times 10^{-2}$ |
| $a_3$ | $0.1631 \times 10^{-4}$ | $0.6356 \times 10^{-8}$ | $0.2832 \times 10^{-7}$ |
| $a_4$ | $-0.6828 \times 10^{-6}$ | $0.1233 \times 10^{-9}$ | $0.6263 \times 10^{-7}$ |

Conic Constant:

| k | 0.5639 | $-0.4078$ | $-12.1758$ |
|---|---|---|---|

Figure 17A:
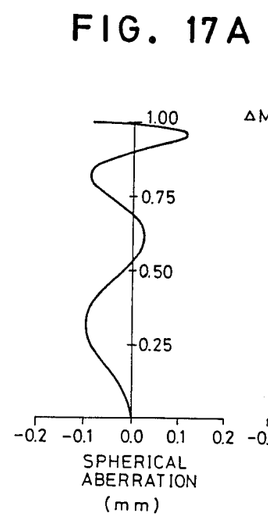
FIGS. 17A, 17B and 17C illustrate graphs of spherical aberration, astigmatism and distortion, respectively, of the optical lens system of FIG. 16.
Figure 17B:
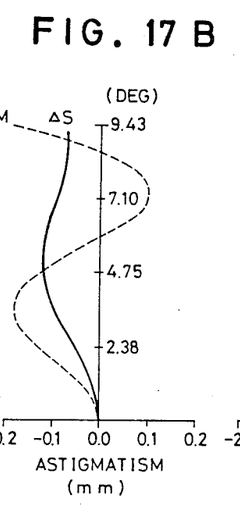
Figure 17C:
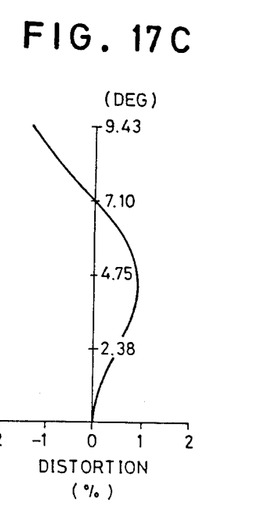

$f/f_1 = 0.93$
$f/f_2 = -0.18$
$[(d_1/n_1) + d_2 + (d_3/n_2)]/f = 0.8248$
$\Delta Z_1/f = -0.0310$
$\Delta Z_2/f = -0.0125$ FIGS. 17A to 17C show various aberrations of the optical lens system of FIG. 16.

As will be seen from the graphs of various aberrations of each example, according to the optical lens system of the present invention, the curvature of field $\Delta S$ in the meridianal image surface is properly controlled relative to the curvature of field $\Delta M$ in the sagittal image surface. In particular, in the case of using the optical lens system of any one of the fifth to seventh Examples V to VII for the lens 6 of the rangefinder shown in FIG. 1, by disposing an apertured plate with a generally rectangular aperture of which a longer side is as long as the length of the light slit, for example sized $4.2 \times 7.5$ mm, in front of the first lens 11 of the optical lens system, the focusing ability of the optical lens system is sufficiently demonstrated.

What is claimed:

1. An optical system for a rangefinding device comprising a first lens element nearest the subject with a convex surface directed toward the subject, and a second meniscus lens element with a convex surface directed toward the subject and on the side of the subject opposite the first element, said optical system having an aspherical surface on the side of said second meniscus lens element opposite the subject and defined by the following relationship (1) and satisfying the following conditions (2) through (6):

$$Z(h) = \frac{h^2/r}{1 + \sqrt{1 - (1 + k)(h^2/r^2)}} + a_1 h^4 + a_2 h^6 + \quad (1)$$

$$a_3 h^8 + a_4 h^{10} + \ldots$$

$$0.75 < \frac{f}{f_1} < 1.25 \quad (2)$$

$$-1.40 < \frac{f}{f_2} < 0.25 \quad (3)$$

$$0.6 < \frac{(d_1/n_1) + d_2 + (d_3/n_2)}{f} < 0.95 \quad (4)$$

$$-0.003 < \frac{\Delta Z_1}{f} \leq 0 \quad (5)$$

$$-0.00015 < \frac{\Delta Z_2}{f} \leq 0 \quad (6)$$

wherein
Z is the surface sag at a semi-aperture distance h from the optical axis of the lens system;

r is the radius of curvature of the lens surface at the optical axis;

k is a conic constant; $a_1$, $a_2$, $a_3$ and $a_4$ are aspheric coefficients for fourth, sixth, eighth and tenth orders, respectively;

f is the focal length of the overall optical system; $f_1$ and $f_2$ are the focal lengths of the first and second lens elements, respectively;

$d_1$ and $d_3$ are the thicknesses of the first and second lens elements;

$d_2$ is the distance between the first and second lens elements;

$n_1$ and $n_2$ are the refractive indices of the first and second lens elements;

$r_4$ is the radius of curvature of the fourth lens surface which is the aspheric lens surface; and $\Delta Z_1$ and $\Delta Z_2$ are the values when h is substituted by $r_4/4$ and $r_4/5$ in the following equation (7), respectively:

$$\Delta Z(h) = \frac{h^2/r_4}{1 + \sqrt{1 - (1 + k)(h^2/r_4^2)}} - \frac{h^2/r_4}{1 + \sqrt{1 - (h^2/r_4^2)}} + a_1 h^4 + a_2 h^6 + a_3 h^8 + a_4 h^{10} + \ldots \quad (7)$$

2. An optical system as defined in claim 1, wherein said first lens element is a biconvex single lens.

3. An optical system as defined in claim wherein said first lens element is a single positive meniscus lens.

4. An optical system as defined in claim 1, wherein said second lens element is a single positive meniscus lens.

5. An optical system as defined in claim 1, wherein said second lens element is a single negative meniscus lens.

6. An optical system for a rangefinding device comprising a first single lens element nearest the subject with a convex surface directed toward the subject, and a second single lens element with a convex surface directed toward the subject, and a protective transparent plate covering a photoelectric element, arranged in that order from the subject, said optical system having aspherical lens surfaces defined by the following relationship (1) and satisfying the following conditions (2) through (6):

$$Z(h) = \frac{h^2/r}{1 + \sqrt{1 - (1 + k)(h^2/r^2)}} + a_1 h^4 + a_2 h^6 + a_3 h^8 + a_4 h^{10} + \ldots \quad (1)$$

$$0.75 < \frac{f}{f_1} < 1.25 \quad (2)$$

$$-1.40 < \frac{f}{f_2} < 0.25 \quad (3)$$

$$0.6 < \frac{(d_1/n_1) + d_2 + (d_3/n_2)}{f} < 0.95 \quad (4)$$

$$-0.003 < \frac{\Delta Z i_1}{f} \leq 0 \quad (5)$$

$$-0.00015 < \frac{\Delta Z i_2}{f} \leq 0 \quad (6)$$

wherein

Z is the surface sag of the i-th lens surface at a semi-aperture distance h from the optical axis;

r is the radius of curvature of the lens surface at the optical axis;

k is the conic constant;

$a_1$ to $a_4$ are aspheric coefficients;

f is the focal length of the overall optical system;

$f_1$ is the focal length of the i-th lens;

$d_i$ is the thickness or aerial distance between the i-th and (i+1)-th surfaces;

$n_i$ is the refractive index of the i-th lens or transparent plate;

$r_i$ is the radius of curvature of the i-th lens surface which is an aspherical surface; and $\Delta Z i_1$ and $\Delta Z i_2$ are the values when h is replaced by $r_i/4$ and $r_i/5$ in the following equation (7), respectively:

$$\Delta Z(h) = \frac{h^2/r_i}{1 + \sqrt{1 - (1 + k)(h^2/r_i^2)}} - \frac{h^2/r_i}{1 + \sqrt{1 - (h^2/r_i^2)}} + a_1 h^4 + a_2 h^6 + a_3 h^8 + a_4 h^{10} + \ldots \quad (7)$$

7. An optical system as defined in claim 6, wherein the first and fourth lens surfaces are aspherical and their numerical data are as follows:

| Surface Number Si | $r_i$ | $d_i$ | $n_i$ |
|---|---|---|---|
| S1 | 6.009 | 3.902 | 1.48554 |
| S2 | −23.692 | 2.561 | |
| S3 | 7.825 | 3.500 | 1.48554 |
| S4 | 2.394 | 2.428 | |
| S5 | — | 0.6 | 1.55 |

Aspherical Surfaces: $S_1$ and $S_4$
Aspheric Coefficients:

| | $S_1$ | $S_4$ |
|---|---|---|
| $a_1$ | $-0.2234 \times 10^{-3}$ | $-0.5095 \times 10^{-2}$ |
| $a_2$ | $0.6072 \times 10^{-5}$ | $0.9799 \times 10^{-2}$ |
| $a_3$ | $-0.7823 \times 10^{-6}$ | $-0.2149 \times 10^{-2}$ |
| $a_4$ | $0.1669 \times 10^{-7}$ | $-0.4195 \times 10^{-9}$ |

Conic Constants:

| | $S_1$ | $S_4$ |
|---|---|---|
| k | −0.4852 | 0 |

8. An optical system as defined in claim 6, wherein said first, third and fourth surfaces are aspherical surfaces.

9. An optical system as defined in claim 8, having numerical data as follows:

| Surface Number Si | $r_i$ | $d_i$ | $n_i$ |
|---|---|---|---|
| S1 | 5.500 | 3.500 | 1.48554 |
| S2 | 35.043 | 6.074 | |
| S3 | 3.752 | 1.500 | 1.48554 |
| S4 | 2.750 | 2.100 | |
| S5 | 13 | 0.54 | 1.52 |

Aspherical Surfaces: $S_1$, $S_3$ and $S_4$
Aspheric Coefficients:

| | $S_1$ | $S_3$ | $S_4$ |
|---|---|---|---|
| $a_1$ | $-0.1177 \times 10^{-4}$ | $-0.3535 \times 10^{-2}$ | $-0.1411 \times 10^{-1}$ |
| $a_2$ | $0.5857 \times 10^{-5}$ | $-0.2682 \times 10^{-2}$ | $-0.2221 \times 10^{-2}$ |
| $a_3$ | $-0.3521 \times 10^{-6}$ | $0.1874 \times 10^{-3}$ | $-0.5625 \times 10^{-8}$ |
| $a_4$ | $0.8086 \times 10^{-8}$ | $0.1394 \times 10^{-10}$ | $-0.3768 \times 10^{-10}$ |

-continued

| | | |
|---|---|---|
| Conic Constants: | | |
| k  −0.4350 | 0 | 0 |

10. An optical system as defined in claim 8, having numerical data as follows:

| Surface Number $S_i$ | $r_i$ | $d_i$ | $n_i$ |
|---|---|---|---|
| S1 | 5.500 | 3.500 | 1.48554 |
| S2 | 36.467 | 6.082 | |
| S3 | 3.868 | 1.500 | 1.48554 |
| S4 | 2.820 | 2.077 | |
| S5 | — | 0.54 | 1.52 |

Aspherical Surfaces: $S_1$, $S_3$ and $S_4$
Aspheric Coefficients:

| | $S_1$ | $S_3$ | $S_4$ |
|---|---|---|---|
| $a_1$ | $0.2712 \times 10^{-4}$ | $-0.4947 \times 10^{-2}$ | $-0.1693 \times 10^{-1}$ |
| $a_2$ | $-0.1243 \times 10^{-5}$ | $-0.1929 \times 10^{-2}$ | $-0.1345 \times 10^{-2}$ |
| $a_3$ | $0.4279 \times 10^{-7}$ | $-0.5050 \times 10^{-5}$ | $-0.1626 \times 10^{-7}$ |
| $a_4$ | $-0.2478 \times 10^{-9}$ | $0.2020 \times 10^{-4}$ | $-0.1226 \times 10^{-9}$ |
| Conic Constants: | | | |
| k | −0.4224 | 0 | 0 |

11. An optical system as defined in claim 8, having numerical data as follows:

| Surface Number $S_i$ | $r_i$ | $d_i$ | $n_i$ |
|---|---|---|---|
| S1 | 5.500 | 3.500 | 1.48554 |
| S2 | 36.381 | 6.087 | |
| S3 | 3.884 | 1.507 | 1.48554 |
| S4 | 2.831 | 2.070 | |
| S5 | — | 0.54 | 1.52 |

Aspherical Surfaces: $S_1$, $S_3$ and $S_4$
Aspheric Coefficients:

| | $S_1$ | $S_3$ | $S_4$ |
|---|---|---|---|
| $a_1$ | $0.5873 \times 10^{-4}$ | $-0.4850 \times 10^{-2}$ | $-0.1675 \times 10^{-1}$ |
| $a_2$ | $-0.4876 \times 10^{-5}$ | $-0.1929 \times 10^{-2}$ | $-0.1345 \times 10^{-2}$ |
| $a_3$ | $0.3531 \times 10^{-6}$ | $-0.5052 \times 10^{-5}$ | $-0.1626 \times 10^{-7}$ |
| $a_4$ | $-0.7729 \times 10^{-8}$ | $0.2020 \times 10^{-4}$ | $-0.1222 \times 10^{-9}$ |
| Conic Constants: | | | |
| k | −0.4456 | 0 | 0 |

12. An optical system as defined in claim 8, having numerical data as follows:

| Surface Number $S_i$ | $r_i$ | $d_i$ | $n_i$ |
|---|---|---|---|
| S1 | 5.884 | 2.815 | 1.48554 |
| S2 | 26.632 | 7.564 | |
| S3 | 3.697 | 1.818 | 1.48554 |
| S4 | 3.499 | 2.064 | |
| S5 | — | 0.54 | 1.52 |

Aspherical Surfaces: $S_1$, $S_3$ and $S_4$
Aspheric Coefficients:

| | $S_1$ | $S_3$ | $S_4$ |
|---|---|---|---|
| $a_1$ | $0.2700 \times 10^{-3}$ | $0.9211 \times 10^{-2}$ | $-0.1171 \times 10^{-1}$ |
| $a_2$ | $-0.6796 \times 10^{-4}$ | $-0.9817 \times 10^{-3}$ | $0.1040 \times 10^{-5}$ |
| $a_3$ | $0.4770 \times 10^{-5}$ | $0.2541 \times 10^{-8}$ | $0.2232 \times 10^{-7}$ |
| $a_4$ | $-0.1184 \times 10^{-6}$ | $-0.5046 \times 10^{-10}$ | $0.4939 \times 10^{-9}$ |
| Conic Constants: | | | |
| k | −0.2714 | −8.5244 | 0 |

13. An optical system as defined in claim 8, having numerical data as follows:

| Surface Number $S_i$ | $r_i$ | $d_i$ | $n_i$ |
|---|---|---|---|
| S1 | 5.508 | 3.490 | 1.48554 |
| S2 | 52.267 | 6.320 | |
| S3 | 5.779 | 1.500 | 1.48554 |
| S4 | 4.092 | 1.790 | |
| S5 | — | 0.540 | 1.52 |

Aspherical Surfaces: $S_1$, $S_3$ and $S_4$
Aspheric Coefficients:

| | $S_1$ | $S_3$ | $S_4$ |
|---|---|---|---|
| $a_1$ | $0.1312 \times 10^{-3}$ | $-0.1142 \times 10^{-1}$ | $-0.1615 \times 10^{-1}$ |
| $a_2$ | $-0.7635 \times 10^{-4}$ | $-0.6822 \times 10^{-3}$ | $-0.4298 \times 10^{-6}$ |
| $a_3$ | $0.5380 \times 10^{-5}$ | $0.1389 \times 10^{-4}$ | $-0.6960 \times 10^{-8}$ |
| $a_4$ | $-0.1444 \times 10^{-6}$ | $0.2020 \times 10^{-4}$ | $-0.1056 \times 10^{-9}$ |
| Conic Constants: | | | |
| k | −0.1647 | −0.8669 | −1.0152 |

14. An optical system as defined in claim 8, having a numerical data as follows:

| Surface Number $S_i$ | $r_i$ | $d_i$ | $n_i$ |
|---|---|---|---|
| S1 | 5.500 | 3.155 | 1.48554 |
| S2 | 35.707 | 6.239 | |
| S3 | 6.951 | 2.267 | 1.48554 |
| S4 | 5.132 | 1.799 | |
| S5 | — | 0.54 | 1.52 |

Aspherical Surfaces: $S_1$, $S_3$ and $S_4$
Aspheric Coefficients:

| | $S_1$ | $S_3$ | $S_4$ |
|---|---|---|---|
| $a_1$ | $-0.1722 \times 10^{-3}$ | $-0.8320 \times 10^{-2}$ | $-0.2586 \times 10^{-3}$ |
| $a_2$ | $-0.1860 \times 10^{-3}$ | $0.1020 \times 10^{-3}$ | $-0.4693 \times 10^{-2}$ |
| $a_3$ | $0.1631 \times 10^{-4}$ | $0.6356 \times 10^{-8}$ | $0.2832 \times 10^{-7}$ |
| $a_4$ | $-0.6828 \times 10^{-6}$ | $0.1233 \times 10^{-9}$ | $0.6263 \times 10^{-7}$ |
| Conic Constants: | | | |
| k | 0.5639 | −0.4078 | −12.1758 |

* * * * *